United States Patent
Augsburg et al.

(10) Patent No.: US 7,426,626 B2
(45) Date of Patent: Sep. 16, 2008

(54) TLB LOCK INDICATOR

(75) Inventors: Victor Roberts Augsburg, Cary, NC (US); James Norris Dieffenderfer, Apex, NC (US); Jeffrey Todd Bridges, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 11/210,526

(22) Filed: Aug. 23, 2005

(65) Prior Publication Data

US 2007/0050594 A1    Mar. 1, 2007

(51) Int. Cl.
    *G06F 12/00*    (2006.01)
(52) U.S. Cl. .................. 711/207; 711/125; 711/126; 711/144; 711/156; 711/163
(58) Field of Classification Search .................. 711/207, 711/125, 126, 144, 156, 163
    See application file for complete search history.

(56) References Cited

U.S. PATENT DOCUMENTS

| | | | |
|---|---|---|---|
| 4,727,485 A | | 2/1988 | Keshlear et al. |
| 6,223,263 B1 * | | 4/2001 | Mathews et al. ............ 711/163 |
| 6,553,477 B1 * | | 4/2003 | Krishna et al. .............. 711/207 |
| 6,941,442 B2 * | | 9/2005 | Devereux ................... 711/207 |
| 7,065,625 B2 * | | 6/2006 | Alderson .................... 711/170 |

FOREIGN PATENT DOCUMENTS

EP    1204029    5/2002

* cited by examiner

*Primary Examiner*—Stephen C Elmore
(74) *Attorney, Agent, or Firm*—Nicholas J. Pauley; Joseph B. Agusta; Thomas Rouse

(57) ABSTRACT

A processor includes a hierarchical Translation Lookaside Buffer (TLB) comprising a Level-1 TLB and a small, high-speed Level-0 TLB. Entries in the L0 TLB replicate entries in the L1 TLB. The processor first accesses the L0 TLB in an address translation, and access the L1 TLB if a virtual address misses in the L0 TLB. When the virtual address hits in the L1 TLB, the virtual address, physical address, and page attributes are written to the L0 TLB, replacing an existing entry if the L0 TLB is full. The entry may be locked against replacement in the L0 TLB in response to an L0 Lock (L0L) indicator in the L1 TLB entry. Similarly, in a hardware-managed L1 TLB, entries may be locked against replacement in response to an L1 Lock (L1L) indicator in the corresponding page table entry.

18 Claims, 4 Drawing Sheets

TLB LOCK INDICATOR

BACKGROUND

The present invention relates generally to the field of processors and in particular to a system and method of locking entries in one or more Translation Lookaside Buffers against replacement.

Microprocessors perform computational tasks in a wide variety of applications, including portable electronic devices. In most cases, maximizing processor performance is a major design goal, to permit additional functions and features to be implemented in portable electronic devices and other applications. Also, in many applications, some computational tasks have priority over others, and it would be advantageous for the system to guarantee that computational resources are reserved for high-priority tasks.

Many programs are written as if the computer executing them had a very large (ideally, unlimited) amount of fast memory. Most modern processors simulate that ideal condition by employing a hierarchy of memory types, each having different speed and cost characteristics. The memory types in the hierarchy vary from very fast and very expensive at the top, to progressively slower but more economical storage types in lower levels. A typical processor memory hierarchy may comprise registers (gates) in the processor at the top level; backed by one or more on-chip caches (SRAM); possibly an off-chip cache (SRAM); main memory (DRAM); disk storage (magnetic media with electromechanical access); and tape or CD (magnetic or optical media) at the lowest level. Most portable electronic devices have limited, if any, disk storage, and hence main memory, often limited in size, is the lowest level in the memory hierarchy.

In a computer memory hierarchy, each lower level maintains a full (but possibly stale) copy of the data resident in higher layers. That is, the data stored in higher levels replicates that in the lower levels. Since smaller, higher level storage may map to multiple locations in the larger, lower level memory, a mapping scheme is required to translate addresses between hierarchy layers. Most processors operate in a very large, conceptually contiguous virtual address space. Main memory is accessed in a physical address space that is constrained by hardware and system parameters. Caches—high-speed memories interposed between the processor core and main memory—may be accessed completely by virtual addresses, completely by physical addresses, or in combination (such as by using a virtual index and a physical tag). Regardless of the cache configuration, however, addresses must be translated from virtual address space to physical address space.

The mapping and translation of many large virtual address spaces (one per running program or context) to one limited physical memory address space is known as memory management. Memory management by the operating system ensures proper performance by preventing programs from overwriting each other's data; provides security by disallowing one user from accessing another's data; and promotes reliability by disallowing user-level programs from accessing supervisor-level data structures, such as operating system allocation tables and parameters.

Memory may be managed in fixed-size segments called pages, which may for example comprise 4 K bytes. The upper, or most-significant, portion of an address, called the page number, identifies a particular memory page. The page number is translated from virtual to physical address space. The lower, or least-significant portion of the address, called a page offset, is an offset into the page that is the same for virtual and physical addresses; page offset bits are not translated. As an example, for a 32-bit address with 4 K pages, the page number would comprise address bits [31:12] and the page offset, bits [11:0]:

TABLE 1

| Page Fields of Address | | | | | |
|---|---|---|---|---|---|
| 31 | page number | 12 | 11 | page offset | 0 |

The mapping of virtual to physical page numbers is controlled by the operating system software, in one or more data structures called page tables. A page table may be a single table, or a hierarchical or tree-like series of tables, each mapping a portion or segment of the virtual page number to a corresponding range of physical memory. The page tables additionally store attributes of the physical pages, such as read, write and execute permissions, whether the page is shared or dedicated to a single process, and the like. Initially, the processor must "walk," or traverse the page tables to translate a new virtual address to a corresponding physical address, to access main memory (or cache memory, if it is physically indexed or tagged). Subsequent address translations may be speeded by storing the virtual and physical page numbers, and the page attributes, in a TLB. A TLB may store address translations and page attributes for both data and instruction pages. Additionally, an instruction TLB (ITLB), which may comprises a subset of a unified TLB, may separately store address translations and page attributes for instructions.

A TLB may comprise a Content Addressable Memory (CAM) and associated Random Access Memory (RAM), each having a fixed number of entries, such as for example 32, 64, or 128. The CAM performs a parallel comparison of a virtual page number presented for translation, against all stored, previously translated virtual page numbers. The output of the CAM is the location of the stored virtual page number that matches the applied virtual page number. This location indexes the RAM, which provides the stored physical page number corresponding to the virtual page number, as well as the page attributes. The physical address applied to the cache and/or main memory is then the physical page number retrieved from the TLB, concatenated with the page offset from the virtual address.

When a new virtual page number is presented for translation, a TLB miss occurs, and the processor must traverse the page tables to perform a translation. When the page table walk is complete, the virtual and physical page numbers and page attributes are stored in an empty location in the TLB. If the TLB is full, an existing entry must be replaced with the new entry. A variety of replacement algorithms are known in the art, such as random, round-robin, not recently used, First In-First Out (FIFO), second-chance FIFO, least recently used, not frequently used, aging, and the like. For memory pages associated with critical tasks, many TLB implementations allow the operating system to lock one or more TLB entries against replacement, to ensure that the entries always reside in the TLB to perform fast translation for the critical tasks. Locked TLB entries do not participate in the TLB replacement algorithm when a TLB entry must be replaced. However, not all processor instruction sets include TLB management instructions, such as instructions to lock TLB entries against replacement. In these cases, the TLB is managed by hardware, and the operating system may lack any way to directly lock TLB entries.

For higher performance, a processor may include a smaller, faster TLB having, e.g., 4, 8, or 16 entries, called a Level-0 or L0 TLB (with the main TLB referred to as a Level-1 or L1 TLB). The L0 TLB is also known in the art as a micro TLB. The L0 TLB stores the few most recently used address translations, capitalizing on the temporal and spatial locality principle of most programs, that instructions or data from a memory page recently accessed are likely to be fetched again. To translate a virtual address, the processor first presents the virtual page number to the L0 TLB. If the virtual page number hits in the L0 TLB, a corresponding physical page number and page attributes are provided. If the virtual page number misses in the L0 TLB, the virtual page number is presented to the L1 TLB for translation.

Generally, the L0 TLB is a hardware implementation that is not recognized or directly controlled by software. That is, software cannot directly read and write L0 TLB entries; management of the L0 TLB is performed by hardware. One consequence of this is that the operating system cannot designate entries in the L0 TLB as locked against replacement. The ability to lock one or more L0 TLB entries against replacement would be advantageous, as it would ensure that the fastest translation is always available for critical tasks.

SUMMARY

In one embodiment, for a hardware managed L1 TLB, page table entries include an indicator, such as a L1 Lock (L1L) bit, that indicate whether a corresponding entry should be locked against replacement when stored in a L1 TLB. In another embodiment, where an L1 TLB is managed by the operating system (and includes the ability to lock entries), the L1 TLB entries include an indicator, such a L0 Lock (L0L) bit, that indicate whether the entry should be locked against replacement when stored in a L0 TLB. In this embodiment, when a virtual address misses in the L0 TLB and hits in the L1 TLB, the virtual address, physical address and page attributes are written to the L0 TLB. The entry is locked against replacement in the L0 TLB, or not, in response to the L0L bit in the L1 TLB entry.

One embodiment relates to a method of managing a hierarchical Translation Lookaside Buffer (TLB). An entry from an upper level TLB is replicated to a lower level TLB. The entry in the lower level TLB is locked against replacement in response to an indicator in the upper level TLB entry.

Another embodiment relates to a processor. The processor includes an instruction execution pipeline and a hierarchical Translation Lookaside Buffer (TLB) comprising a higher level TLB and a lower level TLB. Entries in the lower level TLB replicate entries in the higher level TLB. The processor also includes a TLB controller operative to first access the lower level TLB in an address translation, and to access the higher level TLB if a matching entry is not found in the lower level TLB. The controller is further operative to lock an entry in the lower level TLB in response to an indicator in the corresponding entry in the higher level TLB.

Another embodiment relates to a method of translating a virtual address to a physical address in a processor. A memory access instruction is executed to generate a virtual address. A Level-0 Translation Lookaside Buffer (L0 TLB) is accessed with a portion of the virtual address. If the virtual address misses in the L0 TLB, a Level-1 TLB (L1 TLB) is accessed with a portion of the virtual address. If the virtual address hits in the L1 TLB, a portion of a physical address and page attributes are obtained from the L1 TLB, a Level-0 Lock (L0L) indicator in the L1 TLB entry is inspected, a portion of the virtual address, a portion of the physical address and the page attributes are written as an entry in the L0 TLB, and the L0 TLB entry is locked against replacement in response to the L0L indicator.

Another embodiment relates to a method of managing a Translation Lookaside Buffer (TLB). Upon a TLB miss for a virtual address, a page table walk is performed to obtain a corresponding physical address and lock indicator. An entry comprising at least the virtual and physical addresses is written to the TLB. The entry in the TLB is locked against replacement in response to the lock indicator.

DETAILED DESCRIPTION

Figure 1:
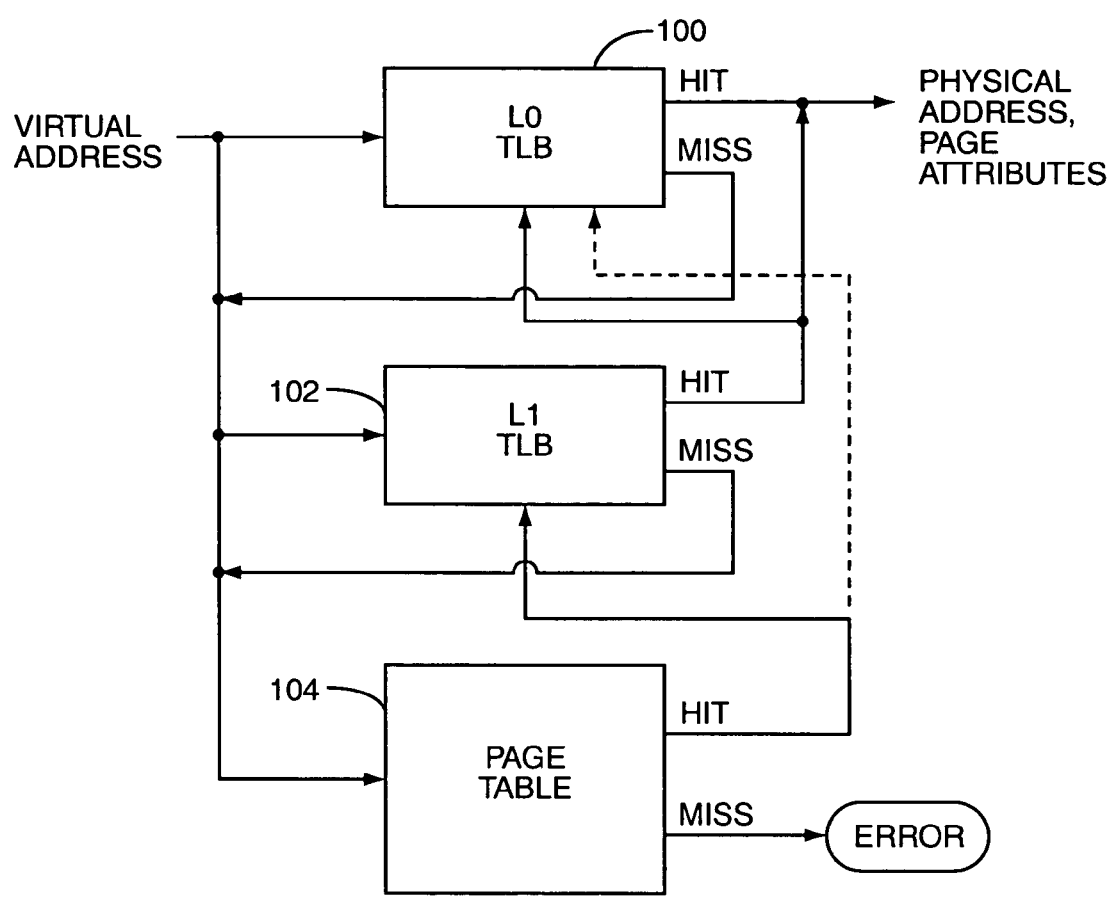
FIG. 1 is a functional block diagram of a L0 TLB, L1 TLB and page table.

FIG. 1 is a functional block diagram depicting a L0 TLB 100, a L1 TLB 102 and a page table 104. The L0 TLB 100 and L1 TLB 102 are circuits in a processor and the page table 104 is a logical data structure in memory. A virtual address, or part of a virtual address, such as the page number, is presented to the L0 TLB 100. If the virtual address hits, the L0 TLB 100 provides a corresponding physical address and page attributes, and the cache or main memory access may continue. This is the fastest address translation, and hence is preferred for high performance.

If the virtual address misses in the L0 TLB 100, the L1 TLB 102 is accessed. Due to its larger size, the L1 TLB 102 access takes longer than an L0 TLB 100 access. If the virtual address hits in the L1 TLB 102, the corresponding physical address and page attributes are provided, and are written to the L0 TLB 100, replacing an existing entry in the L0 TLB 100 according to whatever replacement algorithm the L0 TLB 100 operates under.

If the virtual address misses in the L1 TLB 102, the page table 104 is accessed to ascertain the virtual to physical mapping. While depicted as a single functional block in FIG. 1, the page table 104 may comprise multiple page tables in a nested data structure, and the full page table 104 traversal may comprise several iterative accesses. When the page table 104 traversal is complete, the physical address and page attributes are written to the L1 TLB 102, replacing an existing L1 TLB 102 entry, if necessary, according the currently operative replacement algorithm. If address translation information is not found in the page table 104, an error is generated.

Following the page table 104 walk and writing the entry to the L1 TLB 102, the instruction generating the address translation may be re-executed, and the virtual address will miss in the L0 TLB 100 and hit in the L1 TLB 102. The L1 TLB 102 provides a physical address and page attributes, which are written with the virtual address as an entry into the L0 TLB 100. In some implementations, the physical address and page attributes may be written directly to the L0 TLB upon completion of the page table walk, in parallel with writing the entry to the L1 TLB. This is indicated in FIG. 1 by a dashed line.

When a virtual address misses in the L0 TLB 100 and hits in the L1 TLB 102, the entry is written to the L0 TLB 100. If the L0 TLB 100 is full, an entry must be replaced. It would be advantageous to be able to lock one or more entries in the L0

TLB 100 against replacement, to ensure maximum performance by certain critical tasks. However, in prior art processors, operating system software has no direct access to the L0 TLB 100, and no way to stipulate which—or that any—L0 TLB 100 entries should be locked against replacement. A similar situation occurs with a hardware-managed L1 TLB, where the operating system has no way to lock L1 TLB entries against replacement.

According to one embodiment, a L0 LOCK, or L0L, indicator is added to L1 TLB 102 entries. The L0L indicator may comprise, for example, a bit. The state of the L0L bit communicates to the processor whether or not the entry should be locked against replacement in the L0 TLB 100. The L0L bit may be maintained along with the page attributes in the page table 104. Alternatively, in implementations where the operating system writes entries directly to the L1 TLB 102, software may set the L0L bit or not when an L1 TLB 102 entry is created and stored. When a virtual address misses in the L0 TLB 100 and hits in the L1 TLB 102 (including after an update of the L1 TLB 102 resulting from a page table 104 traversal), the L0L bit is inspected to determine whether the entry should be locked in the L0 TLB 100. If the L0L bit is set, the entry is written to the L0 TLB 100 and locked against replacement.

Similarly, in a processor with a hardware-managed L1 TLB 102, a L1 LOCK, or L1L, indicator is maintained in the page table, and indicates whether the corresponding entry should be locked in the L1 TLB 102. In general, all discussion herein regarding locking L0 TLB 100 entries against replacement applies to locking L1 TLB 102 entries against replacement in the case of a hardware-managed L1 TLB 102.

Figure 2:
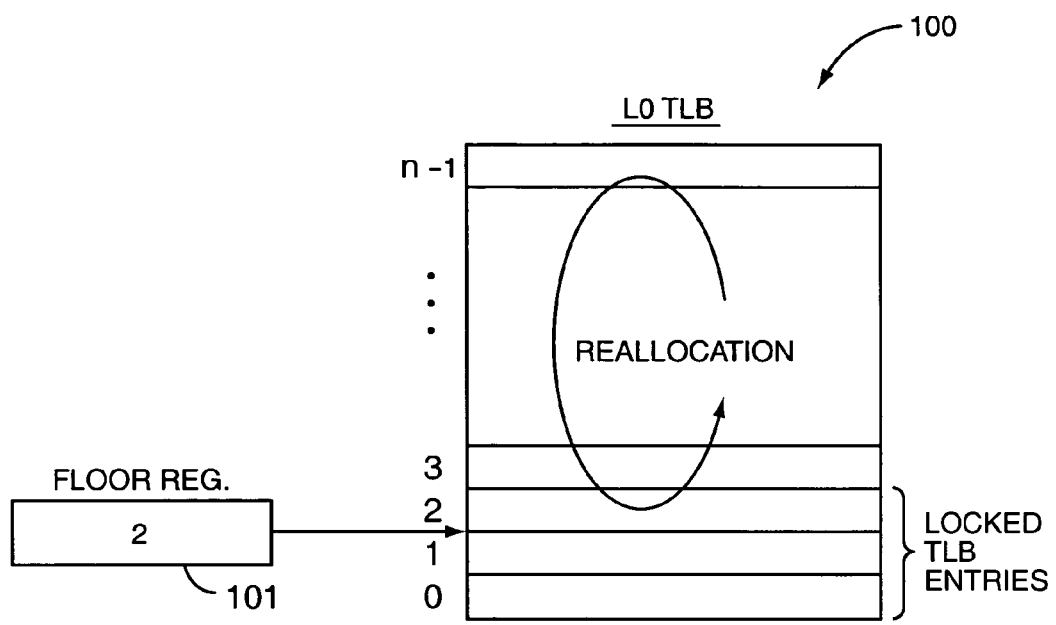
FIG. 2 is a functional block diagram depicting entry locking in a L0 TLB.

FIG. 2 is a functional block diagram depicting a means of locking L0 TLB 100 entries, when indicated by a L0L bit in the L1 TLB 102 entry, according to one embodiment. The L0 TLB 100 includes n entries, numbered from 0 to n−1. A FLOOR register 101 holds the entry number that represents the "floor" of the L0 TLB 100, or the lowest L0 TLB 100 entry available for normal allocation. L0 TLB 100 entries below the floor are not available for replacement, and are hence "locked." If no entries are locked, the FLOOR register 101 contains a 0, and the replacement algorithm operates throughout the L0 TLB 100. If, as depicted in FIG. 2, the bottom two entries are locked in response to an L0L bit in the corresponding L1 TLB 102 entries, the processor will have incremented the FLOOR register 101 to two, the first L0 TLB 100 entry available for reallocation. The normal cache reallocation algorithm in this case operates in the portion of the L0 TLB 100 from the "floor," or two, to the top of the L0 TLB 100, n−1. Entries may be unlocked by decrementing the FLOOR register 101.

Grouping the locked L0 TLB 100 entries in one place simplifies the replacement algorithm. For example, if L0 TLB 100 entries are replaced on a round-robin basis, only the "rollover" point is affected by the locked entries (i.e., when incrementing past n−1, the next entry is that pointed to by the FLOOR register 101 rather than 0). There are no non-contiguous, locked entries scattered across the L0 TLB 100 space that must be "skipped over" by a round-robin allocation. Note that the FLOOR method of grouping and locking L0 TLB 100 entries is representative only, and is not limiting. L0 TLB 100 entries may be locked against reallocation according to a broad variety of methods. Similarly, entries may be locked in the L1 TLB 102, under software control or as dictated in the page table 104, using a FLOOR register, or in other ways, as known in the art.

Figure 3:
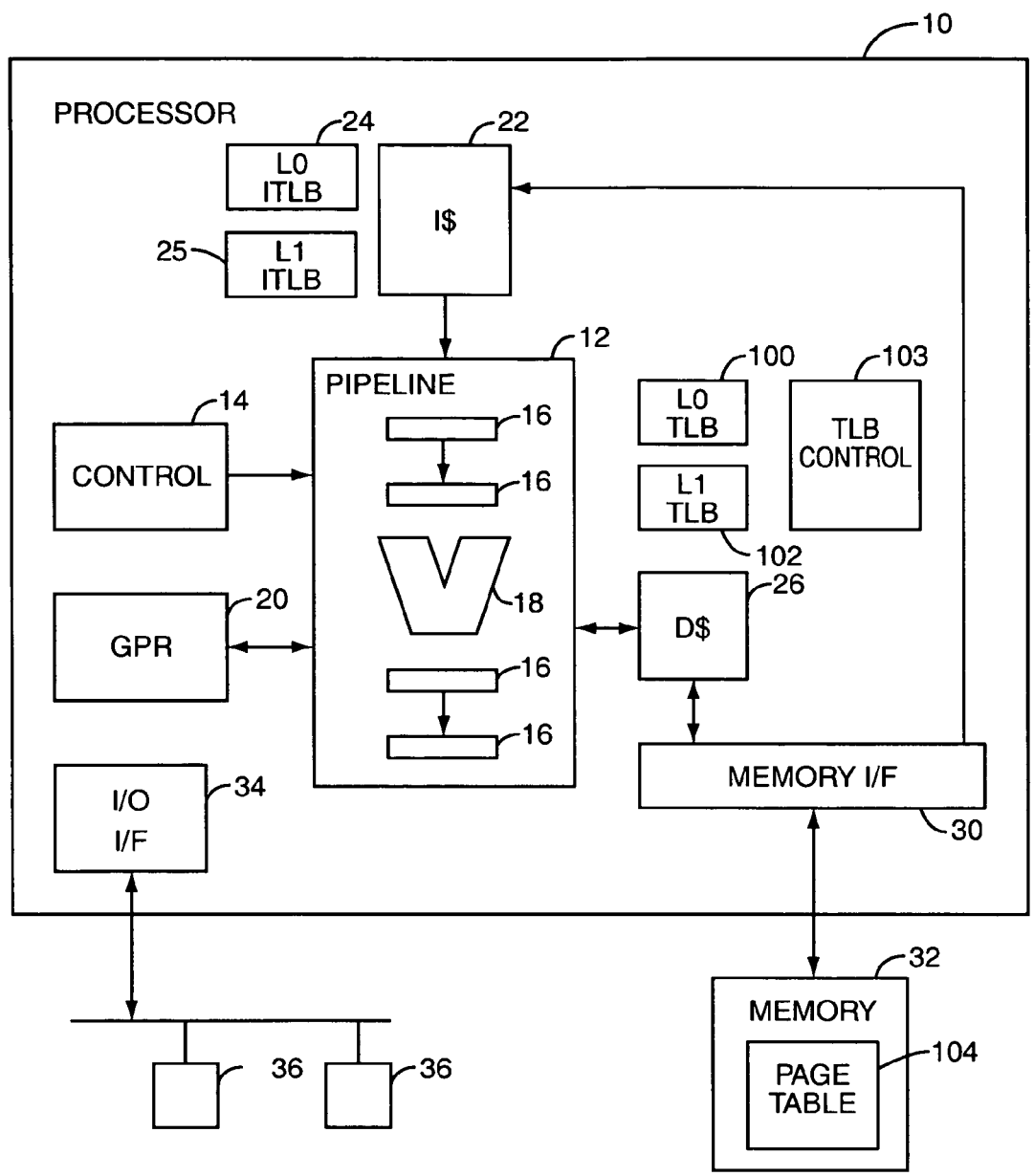
FIG. 3 is a functional block diagram of a processor.

FIG. 3 depicts a functional block diagram of a representative processor 10, employing a pipelined architecture and a hierarchical memory structure. The processor 10 executes instructions in an instruction execution pipeline 12 according to control logic 14. The pipeline includes various registers or latches 16, organized in pipe stages, and one or more Arithmetic Logic Units (ALU) 18. A General Purpose Register (GPR) file 20 provides registers comprising the top of the memory hierarchy.

The pipeline fetches instructions from an Instruction Cache (I-cache) 22, with memory addressing and permissions managed by a Level-0 Instruction-side Translation Lookaside Buffer (L0 ITLB) 24, and a L1 ITLB 25. Data is accessed from a Data Cache (D-cache) 26, with memory addressing and permissions managed by a main L0 TLB 100 and L1 TLB 102. In various embodiments, the L1 ITLB 24 may comprise a copy of part of the L1 TLB 102. Alternatively, the L1 ITLB 24 and L1 TLB 102 may be integrated. Similarly, in various embodiments of the processor 10, the I-cache 22 and D-cache 26 may be integrated, or unified. Misses in the I-cache 22 and/or the D-cache 26 cause an access to main (off-chip) memory 32, under the control of a memory interface 30. Page table 104 is stored in memory 32.

The processor 10 may include an Input/Output (I/O) interface 34, controlling access to various peripheral devices 36. Those of skill in the art will recognize that numerous variations of the processor 10 are possible. For example, the processor 10 may include a second-level (L2) cache for either or both the I and D caches 22, 26. In addition, one or more of the functional blocks depicted in the processor 10 may be omitted from a particular embodiment.

Figure 4:
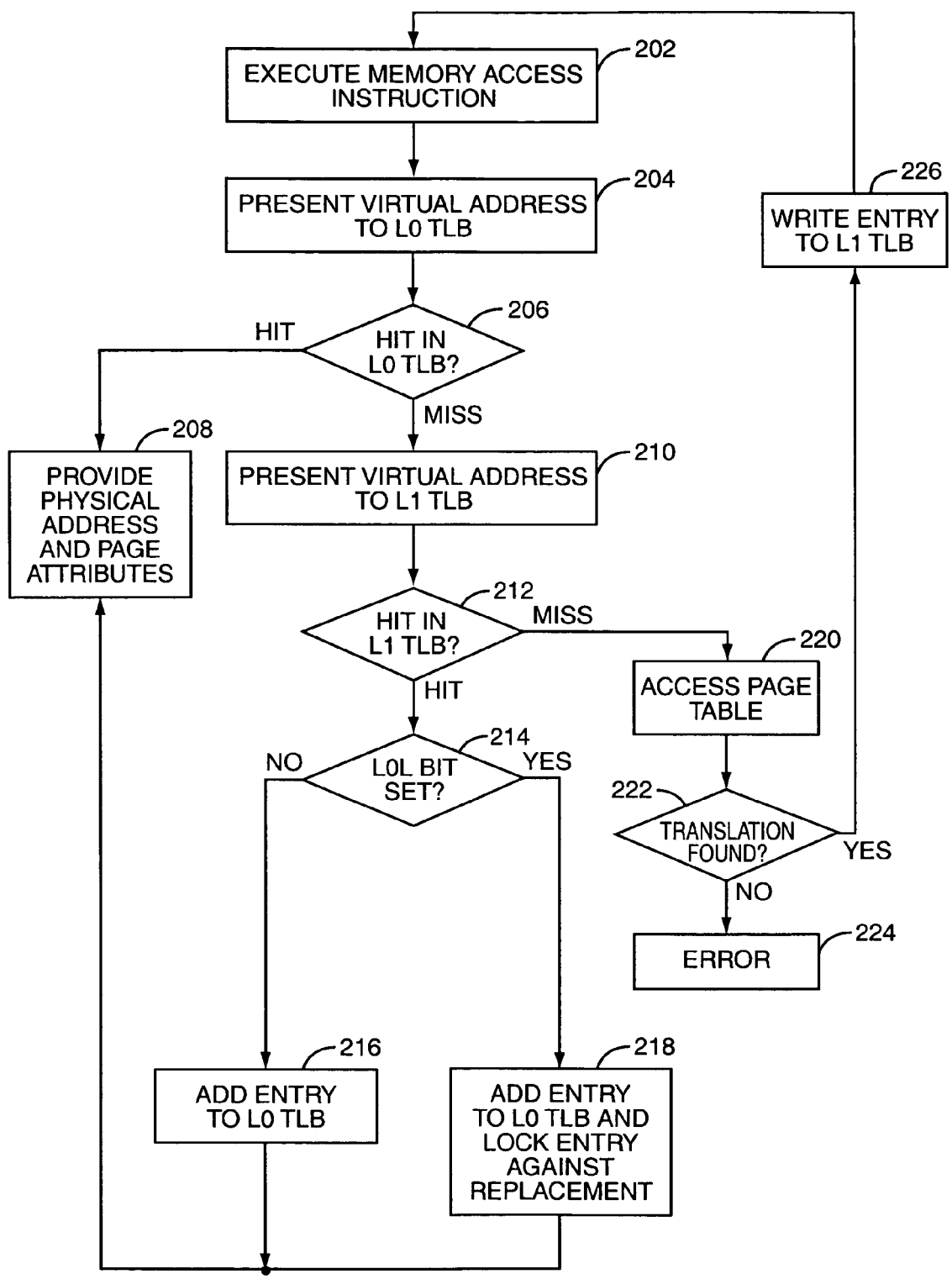
FIG. 4 is a flow diagram of a virtual to physical address translation.

FIG. 4 is a flow diagram depicting a memory address translation process, indicated generally at 200, according to one embodiment. A memory access instruction is executed (block 202), and a virtual address or portion thereof is presented to the L0 TLB 100 (block 204). If the virtual address hits in the L0 TLB 100 (block 206), the L0 TLB 100 provides a physical address or portion thereof, and page attributes (block 208) and the cache 22, 26 or main memory 32 access continues (not shown). If the virtual address misses in the L0 TLB 100 (block 206), the virtual address is presented to the L1 TLB 102 for translation.

If the virtual address hits in the L1 TLB 102 (block 212), the L0L bit in the L1 TLB 102 entry is checked (block 214). If the L0L bit is not set, the entry is added to the L0 TLB 100 (block 216) and the physical address and page attributes are provided (block 208). If the L0L bit is set, the entry is added to the L0 TLB 100 and locked in the L0 TLB 100 against replacement (block 218) and the physical address and page attributes are provided (block 208).

If the virtual address misses in the L1 TLB 102 (block 212), the page table(s) 104 is accessed (block 220) to obtain an address translation. If a translation is not found in the page table 104 (block 222), and error is generated (block 224). If a translation is obtained from the page table 104 (block 222), the translation is written as an entry to the L1 TLB 102 (block 226), including a L0L bit indicating whether the entry should be locked against replacement in the L0 TLB 100. The memory access instruction 202 is then re-executed (block 202) to re-start the address translation process. This time, the virtual address will miss in the L0 TLB 100 (block 206) and hit in the L1 TLB 102 (block 212). The entry will then be written to the L0 TLB 100 and locked or not, depending on the state of the L0L bit in the L1 TLB 102 entry (blocks 214, 216, 218). While the flow diagram of FIG. 4 depicts the steps as sequential, in one embodiment the L0 TLB 100 and L1 TLB 102 accesses occur in parallel.

Defining one or more L0L bits in the L1 TLB 102 entries provides a means for the operating system to designate which entries should be locked against replacement in the L0 TLB 100. This allows the operating system to ensure the fastest possible memory address translations for certain critical tasks, without having direct access to the L0 TLB 100. Similarly, in the case of a hardware-managed L1 TLB 102, a L1 L bit may be maintained in the page table 104, indicating whether the corresponding L1 TLB 102 entry should be locked against replacement.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of managing a hierarchical Translation Lookaside Buffer (TLB) comprising:
   replicating an entry from an upper level TLB to a lower level TLB; and
   locking the entry in the lower level TLB against replacement in response to an indicator in the upper level TLB entry.

2. The method of claim 1 wherein the indicator is a bit in the upper level TLB entry.

3. The method of claim 1 wherein the upper level TLB entry, including the indicator, is set by software.

4. The method of claim 1 wherein the indicator is set by software in a memory page table, and wherein the indicator is set in the upper level TLB entry during a hardware page table expansion operation.

5. The method of claim 1 wherein the lower level TLB is an instruction TLB.

6. The method of claim 1 wherein the lower level TLB is a data TLB.

7. The method of claim 6 further comprising replicating the upper level TLB entry to a lower level instruction TLB and locking the lower level instruction TLB entry against replacement in response to the indicator.

8. A processor, comprising:
   an instruction execution pipeline;
   a hierarchical Translation Lookaside Buffer (TLB) comprising a higher level TLB and a lower level TLB, entries in the lower level TLB replicating entries in the higher level TLB; and
   a TLB controller operative to first access the lower level TLB in an address translation, and to access the higher level TLB if a matching entry is not found in the lower level TLB, the controller further operative to lock an entry in the lower level TLB in response to an indicator in the corresponding entry in the higher level TLB.

9. A method of translating a virtual address to a physical address in a processor, comprising:
   executing a memory access instruction to generate a virtual address;
   accessing a Level-0 Translation Lookaside Buffer (L0 TLB) with a portion of the virtual address;
   if the virtual address misses in the L0 TLB, accessing a Level-1 TLB (L1 TLB) with a portion of the virtual address; and
   if the virtual address hits in the L1 TLB,
      obtaining a portion of a physical address and page attributes from the L1 TLB,
      inspecting a Level-0 Lock (L0L) indicator in the L1 TLB entry,
      writing a portion of the virtual address, a portion of the physical address and the page attributes as an entry in the L0 TLB, and
      locking the L0 TLB entry against replacement in response to the L0L indicator.

10. The method of claim 9 further comprising, if the virtual address misses in the L1 TLB:
    performing a page table traversal to obtain a physical address and page attributes associated with the virtual address; and
    writing a portion of the virtual address, a portion of the physical address, the page attributes and a L0L indicator as an entry in the L1 TLB.

11. The processor of claim 8, further comprising:
    a Level-0 Instruction-side Translation Lookaside Buffer (L0 ITLB);
    a Level-1 Instruction-side Translation Lookaside Buffer (L1 ITLB); and
    an Instruction Cache (I-cache), wherein the instruction execution pipeline is operative to access instructions from the I-cache, with memory addressing and permissions managed by the L0 ITLB and the L1 ITLB.

12. The processor of claim 11, wherein the L1 ITLB and the higher level TLB are integrated.

13. The processor of claim 11, further comprising:
    a Data Cache (D-cache), wherein the instruction execution pipeline is operative to access data from the D-cache, with memory addressing and permissions managed by the lower level TLB and the higher level TLB.

14. The processor of claim 13, wherein the I-cache and the D-cache are integrated.

15. The processor of claim 13, further comprising a second-level (L2) cache.

16. The processor of claim 15, wherein the L2 cache includes the I-cache.

17. The processor of claim 15, wherein the L2 cache includes the D-cache.

18. The processor of claim 8, further comprising an Input/Output (I/O) interface operative to control access to at least one peripheral device.

* * * * *